(12) United States Patent
Martin

(10) Patent No.: US 11,498,496 B2
(45) Date of Patent: Nov. 15, 2022

(54) BLACK TANK ARRANGEMENT

(71) Applicant: Larry Martin, Goshen, IN (US)

(72) Inventor: Larry Martin, Goshen, IN (US)

( * ) Notice: Subject to any disclaimer, the term of this patent is extended or adjusted under 35 U.S.C. 154(b) by 0 days.

(21) Appl. No.: 16/974,224

(22) Filed: Nov. 18, 2020

(65) Prior Publication Data
US 2022/0153211 A1    May 19, 2022

(51) Int. Cl.
*B60R 15/04* (2006.01)
*B02C 18/00* (2006.01)
*E03D 5/01* (2006.01)

(52) U.S. Cl.
CPC .......... *B60R 15/04* (2013.01); *B02C 18/0092* (2013.01); *E03D 5/01* (2013.01)

(58) Field of Classification Search
CPC ...................................................... B60R 15/04
USPC ............ 4/319, 300, 320, 321, 322, 323, 324
See application file for complete search history.

(56) References Cited

U.S. PATENT DOCUMENTS

| | | | | |
|---|---|---|---|---|
| 4,070,714 A * | 1/1978 | Bishton, Jr. | ............. | E03D 5/016 4/318 |
| 5,265,544 A * | 11/1993 | Bigelow | ................. | F23G 7/001 110/345 |
| 5,560,821 A * | 10/1996 | Leo | ......................... | E03F 11/00 210/143 |
| 6,352,088 B1 * | 3/2002 | Stegall | .................... | B60R 15/00 137/899 |
| 10,906,624 B1 * | 2/2021 | MacPherson | ........... | E03F 1/001 |
| 2008/0223468 A1 * | 9/2008 | Stegall | .................... | B60R 15/00 137/899 |
| 2009/0014079 A1 * | 1/2009 | Stegall | .................... | B60R 15/00 137/899 |
| 2012/0012196 A1 * | 1/2012 | Gallo | ...................... | B60R 15/00 137/234.6 |
| 2016/0023217 A1 * | 1/2016 | Cornille | .................. | B60R 15/00 137/2 |
| 2021/0078509 A1 * | 3/2021 | Van Beek | ............... | B60R 15/04 |
| 2021/0180711 A1 * | 6/2021 | Van Riel | ............... | F16K 11/085 |

\* cited by examiner

*Primary Examiner* — Lori L Baker
(74) *Attorney, Agent, or Firm* — Ryan M. Fountain

(57) ABSTRACT

A black tank arrangement is provided having a selectively operable macerator for recirculating fluid adjacent the black tank outlet back toward the black tank inlet, so as to flush or spray waste from that inlet toward the outlet. Selecting the fluid transfer components to be mountable adjacent the end face of the black tank near the black tank outlet allows the invention to be retrofit into previously installed black tanks in vehicles. Operation of the macerator can be manual, via a remote switch held down by the user for a given time period, and/or automatic, in sequence with toilet operation.

9 Claims, 2 Drawing Sheets

BLACK TANK ARRANGEMENT

BACKGROUND OF THE INVENTION

The present invention relates generally to "black tanks" (also called "black water tanks") for holding fluid and solid waste materials, such as the discharge from toilets. More particularly, the present invention relates to black tank arrangements within vehicles, for example, recreational vehicles ("RVs"), such as travel trailers, toy haulers, fifth wheel trailers, motor homes, and like vehicles having at least living quarters therein (and as otherwise defined by the Recreational Vehicle Industry Association). Additional information about RVs can be found on the internet at www.rvia.org.

In general, vehicles (such as RVs or yachts or the like) having living quarters therein have multiple different fluid holding tanks, including, for example, "white tanks" or fresh water tanks (for providing clean water to faucets, showerheads, and washing machines), "clear tanks" or pure drinking water tanks (for providing water to ice makers and drinking water dispensers), "grey tanks" (for receiving discharge fluid from showers, sinks, and washing machines), and "black tanks" (for receiving discharge fluid and solid waste materials from toilets and the like). If the vehicle does not use a grey tank, then all dirty water would be dispensed into the black tank. Black tanks are typically mounted adjacent to toilets, with an inlet thereto directly beneath the toilet outlet. Black tanks typically have an outlet, for allowing the waste collected therein to be removed, at a location adjacent to an exterior side wall of the vehicle and spaced apart or "remote" from the black tank inlet. A waste fluid or sewer hose, or other such flexible conduit, is typically removably connected to the black tank to facilitate transfer of fluid from the black tank to a sewer tank or other such exterior septic facility. While the black tank outlet typically has a removable cap covering the outlet opening, there is often a knife or gate valve, or other such flow controlling valve, between the outlet opening and the black tank.

In order to facilitate complete removal of waste from the black tank, certain prior black tanks have employed inclined lower surfaces between the inlet and the outlet of the black tank. These inclined surfaces are intended to allow waste to slide down to a lower, "sump portion" of the black tank, closer to the outlet, where water and other fluids tend to collect (below the fluid level in the tank) and can intermix with relatively "solid" waste (such as feces) and maintain a more fluidic suspension. Such fluidic suspension is easier to extract from the black tank through the sewer hose than solid waste. However, spacial constraints within the vehicle or the nature of the material used to form such inclined surfaces (or other variables in the nature of the waste and/or the use or construction of the black tank) can preclude those inclined surfaces from guaranteeing that result in every instance. A smaller incline for the surface can result, for example, in feces merely being deposited from the toilet into the elevated area of that surface immediately below the black tank opening, and then adhering to the inclined surface at that location. Subsequent use of the toilet can result in a build up of waste at that location in the black tank, eventually resulting in a significant blockage of the toilet outlet well before that black tank is filled to its capacity, and even sooner than would have occurred with a flat bottomed black tank.

Previously, a solution to this problem has been proposed wherein a macerator was incorporated into the toilet at its outlet, so as to grind up or otherwise fluidize the waste being flushed out of the toilet and into the black tank. Thus, no build up of waste would accumulate on the inclined surface adjacent to the black tank inlet. However, such toilets are significantly more expensive, and typically require connection to an electric power source for operation of the macerator. In the event of a loss or unavailability of electrical power, such toilets would typically be rendered unusable. Further, if the vehicle is left unused for an extended period of time (such as during the winter or other "off" season with an RV) the process of "winterizing" or preparing a macerator toilet for storage is more complicated and time consuming.

Alternative assemblies or procedures to fluidize or move the toilet waste in the black tank with extra water through the toilet (even by additional flushing of the toilet) have the disadvantage of requiring extra water use and supply within the vehicle. However, in vehicles such as RVs, the typical spacial and/or weight constraints do not facilitate adding such an additional water supply for that purpose. Also, to do so would require the use of a larger black tank to received the additional flushing fluid, and spacial constrains may preclude using larger black tanks in a given vehicle.

An external water supply and spraying apparatus, such as may be typically used when the black tank is being flushed clean for complete cleaning or winterizing, can be used to remove the waste buildup on the inclined surfaces near the toilet outlet and remove blockage. However, in addition to the extra apparatus costs, such external flushing is time consuming and can be tedious. Further, vehicles such as RVs are typically intended to also be used at locations where such external water supplies (and/or the associated external sewage receiving tanks) are not available. In addition, in certain geographic locations, extra water use may be strongly discouraged by governmental authority.

OBJECTIVES OF THE INVENTION

Accordingly, a primary objective of the present invention is to provide improvements to black tank arrangements for vehicles, particularly (but not limited to) RVs and the like having toilets therein. These improvements include black tank arrangements which:

a. are inexpensive to manufacture, install, maintain, and repair,
b. increase floor plan optimization when used in a vehicle, such as an RV,
c. minimize component weight and black tank spacial requirements,
d. increase black tank usable capacity, user convenience, and toilet reliability under a variety of conditions,
e. minimize utilization effort and water supply requirements,
f. increase vehicle versatility and operable range, and
g. can be readily retrofittable into previously manufactured vehicles.

SUMMARY OF THE INVENTION

These and other objectives of the present invention are achieved by the provision of a black tank arrangement having a selectively operable macerator for recirculating fluid adjacent the black tank outlet back toward the black tank inlet, so as to flush or spray waste from that inlet toward the outlet. Selecting the fluid transfer components to be mountable adjacent the end face of the black tank near the black tank outlet allows the invention to be retrofit into previously installed black tanks in vehicles. Operation of the macerator can be manual, via a remote switch held down by the user for a given time period, and/or automatic, in sequence with toilet operation.

Other objects, advantages, and novel features of the present invention will become readily apparent from the following drawings and detailed description of certain preferred and alternative embodiments.

DETAILED DESCRIPTION OF THE DRAWINGS AND PREFERRED EMBODIMENTS

The drawings show schematically, and in a best mode version, an embodiment of the present invention as applied to a motor home type of RV, both generically and specifically. However, the present invention is not limited in its embodiments to only such vehicles. The present invention can be readily used in other types of RVs, both towable and motorized, such as travel trailers, "toy haulers," and motor homes. The present invention can also be readily used in other structures, including, for example, manufactured housing, as well as park model mobile homes, and "extended stay" trailers or like structures having living quarters therein.

Figure 1:
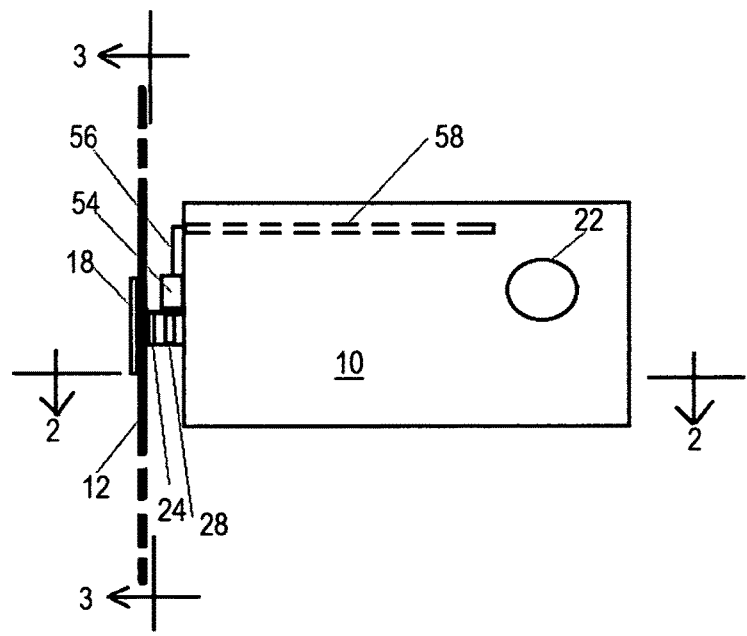
FIG. 1 shows a schematic, top view of a preferred embodiment of the present invention, as mounted in a vehicle, as seen along lines 1-1 in the other drawings.
Figure 2:
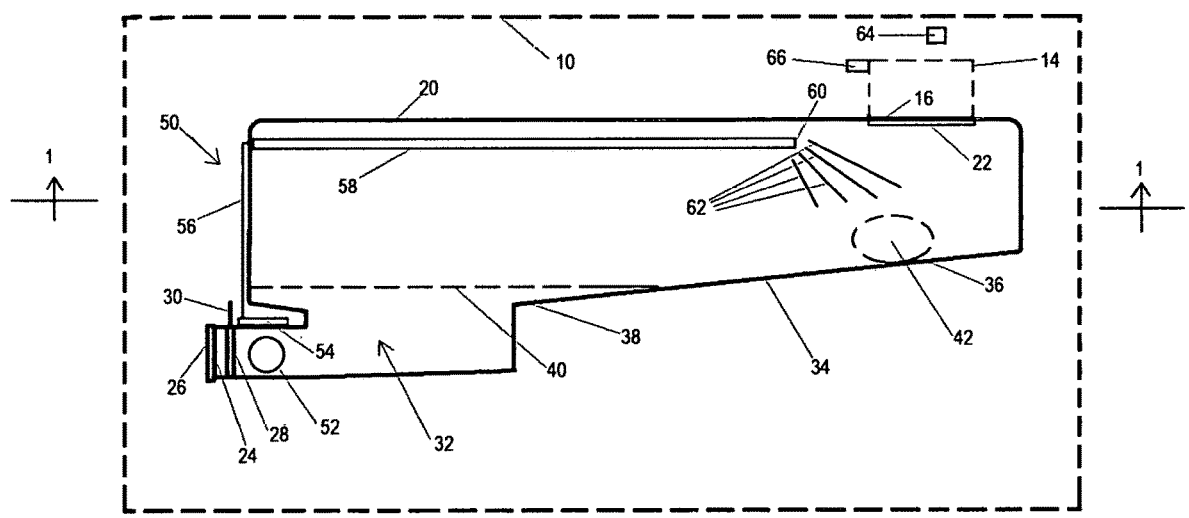
FIG. 2 shows a schematic, cross-sectional view of the embodiment of FIG. 1, as seen along line 2-2.

The drawings are not precisely to scale from one figure to the next. Dashed lines in the drawings indicate generic structural portions whose details not necessary for a full understanding of the present invention, as well as environmental structure and structure providing a frame of reference (such as the hidden location of tube 58 in FIG. 1).

The following features are illustrated in the drawings by these numerals:
- 10 vehicle,
- 12 exterior side wall of the vehicle,
- 14 toilet,
- 16 toilet outlet,
- 18 access cover in the exterior side wall, preferably conventional in nature,
- 20 black tank,
- 22 inlet to black tank,
- 24 outlet to black tank,
- 26 outlet cap,
- 28 gate valve, preferably conventional in nature, such as a knife valve,
- 30 gate valve handle, preferably conventional in nature,
- 32 sump area,
- 34 inclined surface, preferably formed as a bottom wall of the black tank,
- 36 elevated or shallow area,
- 38 lower or deeper area,
- 40 fluid level (variable as toilet is used),
- 42 solid waste or feces,
- 50 fluid transfer device, assembly, or arrangement having at least,
  - 52 opening to fluid transfer device, preferably adjacent to the sump area,
  - 54 pump or macerator,
  - 56 fluid line, preferably a flexible plastic conduit,
  - 58 dispensing tube, preferably a rigid ABS tube of a length sufficient to reach back into the black tank to a location adjacent feces 42,
  - 60 outlet nozzle, having flush or spray inducing opening (s) therein,
  - 62 directed fluid spray from the nozzle outlet,
  - 64 control device/selective actuator, preferably electrically or wirelessly connected to pump 54, such as a conventional push button switch or a bi-stable switch with an associated timer, mounted on a convenient wall or other structure adjacent to toilet 14, and
  - 66 automatic actuation mechanism, preferably electrically or wirelessly connected to pump 54 and responsive to toilet use.

In operation, the user can push and hold down actuator 64 for a desired time period after toilet use, whenever it is deemed appropriate to deal with solid waste sent to the black tank from toilet 14. Alternatively, actuator 64 can be pre-set in a conventional manner to operate pump 54 for a specific time period when the actuator is used. Alternatively still, automatic actuation mechanism can operate pump 54 whenever the toilet is used or according to pre-programmed conditions.

Pump 54, which is preferably a macerator, draws fluid material from sump area 32, through opening 52, and sends it through fluid line 56 to dispensing tube 58. The open end of dispensing tube 58 includes nozzle 60 which is preferably formed to flush or spray that fluid material onto solid waste 42 for a period of time (such as 3 seconds) sufficient to dissolve or wash the sold waste down inclined surface 34 from elevated area 36 toward lower area 38, which is preferably located below the typical or minimal fluid level 40, and close to (if not located directly within) sump area 32. Once the solid waste is within the sump area, the fluids there will tend to break up the solid waste and keep it sufficiently fluidized. In this manner, pump 54 recirculates fluid within the black tank to prevent blockage of the toilet outlet.

In certain embodiments, nozzle 60 can be formed as a single, relatively wide opening at the end of tube 58, such as by integration of the nozzle function with the tube, forming it as merely an open tube end. Such an opening is less prone to clogging and can deliver a flush of fluid toward solid waste 42. Alternatively, and especially if a sufficiently effective macerator is used as the pump 54 (so as to completely fluidize the material drawn from the sump area and avoid potential clogging), nozzle 60 can include a plurality of opening which establish a spray effect onto solid waste 42.

In order to provide an appropriate fluid level within the black tank after it has been cleaned, it has been found advantageous to operate the toilet for a minute or so, until a few gallons of water are within the black tank. This will give pump 54 some fluid to start the recirculating fluid action with when first actuated. With given toilets, it may be advisable to close the toilet during actuation of pump 54, so as to prevent potential splash back through the toilet.

Figure 3:
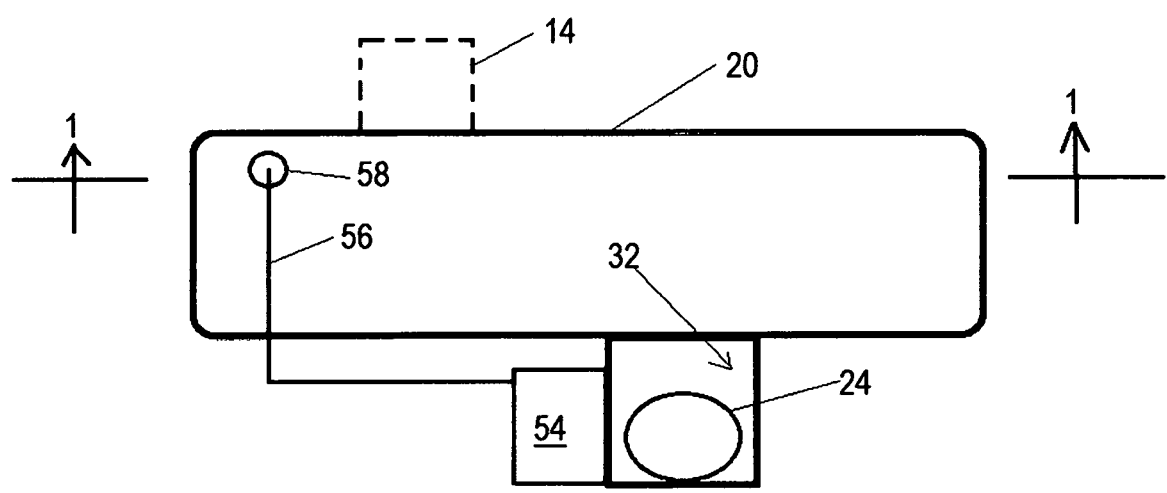
FIG. 3 shows a schematic, end view of the embodiment of FIG. 1, as seen along line 3-3, with the gate valve handle omitted for clarity.

Although the present invention has been shown and described herein with respect to certain preferred embodiments and alternative configurations, those were by way of illustration and example only. For example, if desired for a specific application, pump 54 can be connected to opening 52 via an additional conduit or tube (not shown in the drawings), rather than via the direct connection shown in the drawings. Also, opening 52 is shown in the drawings to be immediately adjacent to outlet 24. However, in other embodiments of the present invention, opening 52 is sufficiently "adjacent" to outlet 24 if it is located in, or with a conduit leading to, sump area 32 of the black tank, such that it can allow the fluid in the sump area to be drawn into pump 54. Further, fluid line 56 can be run from pump 54 to any desired port into the black tank, instead of a port on the end face shown in FIG. 3. In certain embodiments, for example, fluid line 56 can be run along the top or a side surface of the black tank to a location adjacent inlet 22, and nozzle 60 applied directly to fluid line 56 (omitting the need for dispensing tube 58). Further still, the present invention is illustrated herein with a single inclined surface extending from the inlet of the black tank toward its outlet, but it is also applicable to black tanks formed with sideways directed inclined surfaces or opposing inclined surfaces. In addition, as shown in the drawings, mounting certain components of the fluid transfer device on or near the exterior of the black tank simplifies retrofitting of the present invention to pre-existing black tanks. However, certain embodiments the components of the present invention need not be mounted on the exterior of the black tank. For example, pump 54 (with an integrated opening 52 leading to sump area 32) and fluid line 56 can be mounted inside of the black tank.

Accordingly, the spirit and scope of the present invention is intended to be limited only by the terms of the appended claims.

What is claimed is:

1. A vehicular black tank arrangement comprising:
    a black tank,
    an inlet to said black tank, for receiving waste,
    an outlet from said black tank, for allowing waste to be removed from said black tank, located remote from said inlet, and
    a fluid transfer device, connected to said black tank adjacent to said outlet, for providing fluid from the black tank to the area of said black tank which is adjacent to said inlet.

2. The arrangement according to claim 1 wherein an inclined surface is disposed within said tank such that an elevated area of said inclined surface is located adjacent to said inlet, and a lower area of said inclined surface is located remote from said inlet and toward said outlet.

3. The arrangement according to claim 2 wherein said fluid transfer device includes a mechanism for selective actuation to recirculate fluid from said area of said black tank which is adjacent to said outlet toward said elevated area of said inclined surface.

4. The arrangement according to claim 3 wherein said fluid transfer device includes a macerator.

5. The arrangement according to claim 3 wherein said fluid transfer device includes:
    a pump mounted exterior of said black tank with a pump inlet leading from a portion of said black tank adjacent to said outlet, and
    a fluid line leading from said pump to a portion of said black tank adjacent to said inlet.

6. The arrangement according to claim 3 wherein said mechanism includes a control device for actuation at a location remote from said black tank.

7. The arrangement according to claim 1 wherein said black tank is mounted within a vehicle having a toilet therein, at a location immediately below the outlet from said toilet.

8. The arrangement according to claim 7 wherein said fluid transfer device is connected to a selective actuator located adjacent to said toilet.

9. The arrangement according to claim 6 wherein said fluid transfer device includes an actuation mechanism automatically responsive to use of said toilet.

* * * * *